United States Patent

Scholl et al.

[15] 3,699,374
[45] Oct. 17, 1972

[54] LIGHT ACTIVATED, HIGH RESOLUTION, FIELD SUSTAINED CONDUCTIVITY IMAGE STORAGE AND DISPLAY DEVICE

[72] Inventors: Ronald F. Scholl, Malibu; William P. Bleha, Jr., Santa Monica, both of Calif.

[73] Assignee: Hughes Aircraft Company, Culver City, Calif.

[22] Filed: July 15, 1971

[21] Appl. No.: 162,887

[52] U.S. Cl. ............. 313/94, 250/213 R, 313/108 A
[51] Int. Cl. ............................................. H01j 1/63
[58] Field of Search .......... 313/108 A, 94; 250/213 R

[56] References Cited

UNITED STATES PATENTS 3,590,253  6/1971  Novice et al. ...... 313/108 A X
3,648,052  3/1972  Nakamura et al..313/108 A X Primary Examiner—Palmer C. Demeo
Attorney—W. H. MacAllister, Jr. et al.

[57] ABSTRACT

This invention provides a solid state image-storage panel, in the form of a multi-layered thin film structure, which can exhibit and retain a high resolution image momentarily impressed thereupon by light. The image can either be projected on the panel in entirety or can be recorded sequentially by a scanning light beam. The intensity of light impinging on an elemental area of the image-storage panel creates local conductivity modulations within the storage film thereof which correspond to the input image. These modulations, in turn, alter local field configurations across an electroluminescent layer disposed adjacent the storage film, thus creating a visible output image. After initial exposure, the conductivity modulations in the storage film are maintained for an extended period of time (several tens of seconds) provided that an applied electric field across the storage film continues to be maintained. This phenomenon is hereinafter referred to as "field sustained conductivity." Removal or reversal of the applied electrical field restores the storage film to its initial insulating condition, and the image-storage panel is thereby erased.

6 Claims, 4 Drawing Figures

LIGHT ACTIVATED, HIGH RESOLUTION, FIELD SUSTAINED CONDUCTIVITY IMAGE STORAGE AND DISPLAY DEVICE

BACKGROUND OF THE INVENTION

The image-storage panel of the present invention employs a transparent top electrode over a cadmium sulfide film. Contemporary storage panels, on the other hand, employ a top electrode which is opaque and thus not suitable for optical transmission. Contemporary storage panels have two possible structures: one with an opaque antifeedback layer between a cadmium sulfide film and an electroluminescent layer and another without the opaque layer. The storage panel with the opaque layer cannot be used with light input because of the cadmium sulfide detector film being covered with an opaque layer on both sides.

In other contemporary storage panels without an opaque layer, it is possible to optically excite the cadmium sulfide film through the bottom electrode and thus through its associated electroluminescent layer. This mode of operation, however, is not practical because optical feedback cannot be eliminated. The presence of optical feedback causes the image to spread thus losing the important feature of high resolution and duration of the stored image. Other contemporary optically addressed image storage panels are outlined below:

1. One layer panel (electroluminescent and photoconductor functions performed by the same layer).

This panel, made from a layer of CdS/ZnS powder in a binder, has the following properties:

| | |
|---|---|
| Image storage time | : 30 minutes |
| Contrast | : can store halftones |
| Image erase time | : greater than 1 sec |
| Max stored brightness | : 0.25 ft-L |
| Resolution | : 100–200 line pairs per inch |
| Supply voltage | : 60–120V dc |

2. Photoconductor layer/opaque layer/electroluminescent layer.

Panels of this kind, comprised of powder layers in binders, have been made in several variations. One of the most successful uses grooves in the photoconductor. This panel has the following properties:

| | |
|---|---|
| Image storage time | : decays to 1/e of max. brightness (2 ft-L) in 3 secs. |
| Contrast | : greater than 100:1 |
| Image erase time | : less than 1 sec. |
| Max. stored brightness | : 2.0 ft-L |
| Resolution | : 40 line pairs per inch |
| Supply voltage | : 300 V ac, 420 Hz with dc bias of 420 V |

3. Hysteresis-type photoconductor panel

In certain CdSe powder photoconductors with an applied voltage (ac or dc) above some threshold value, a momentary illumination produces a sustained current. Lowering of the applied voltage below this threshold value causes the current to assume a lower value. This layer coupled with an electroluminescent layer has produced a panel with the following characteristics:

| | |
|---|---|
| Image storage time | : greater than 1 hr. |
| Contrast | : greater than 100:1. Essentially bistable but some degree of halftone operation possible. |
| Image erase time | : 100 ms |
| Max. stored brightness | : 1 ft-L |
| Resolution | : 40 line pairs per inch (image is grainy due to high noise currents) |
| Supply voltage | : greater than 300 V ac, 60 Hz |

4. Optical feedback panel

In this type of panel optical feedback from the electroluminescent layer is utilized to keep the photoconductor in the conducting state. Specially designed panels to minimize spreading have given the following characteristics:

| | |
|---|---|
| Image storage time | : indefinite |
| Contrast | : greater than 100:1, bistable (black and white only) |
| Image erase time | : less than 1 sec. |
| Max. stored brightness | : 0.5 ft-L |
| Resolution | : 40 line pairs per inch |
| Supply voltage | : 300 V ac, 420 Hz, with 420 V dc bias |

SUMMARY OF THE INVENTION

The advantages over contemporary storage panels is evident by a consideration of the characteristics of the image storage panel of the present invention:

| | |
|---|---|
| Image storage time | : 30 sec. |
| Contrast | : 100:1 (4–5 shades of gray) |
| Image erase time | : 10 msec |
| Max. stored brightness | : 2–3 ft-L |
| Resolution | : 200–500 line pairs per inch |
| Supply voltage | : 40–100 V dc |
| Construction | : Vacuum deposited thin films of inexpensive starting materials |
| General | : Panel has black face (due to opaque layer) which improves contrast under high ambient light viewing conditions |

The significant advantage of the device of the present invention over contemporary panels is seen to be the high resolution capability. Prior art panels have been limited in resolution because of the grain size in powder layers or by grooves cut in the panels to improve operating characteristics. Other advantages of the present invention include halftone reproduction and fast image erase time. Another important consideration in operation is the black, low-reflectance viewing face of the panel which allows the panel to be used under ambient light conditions where the image normally would be washed out.

DESCRIPTION OF PREFERRED EMBODIMENT

Figure 1:
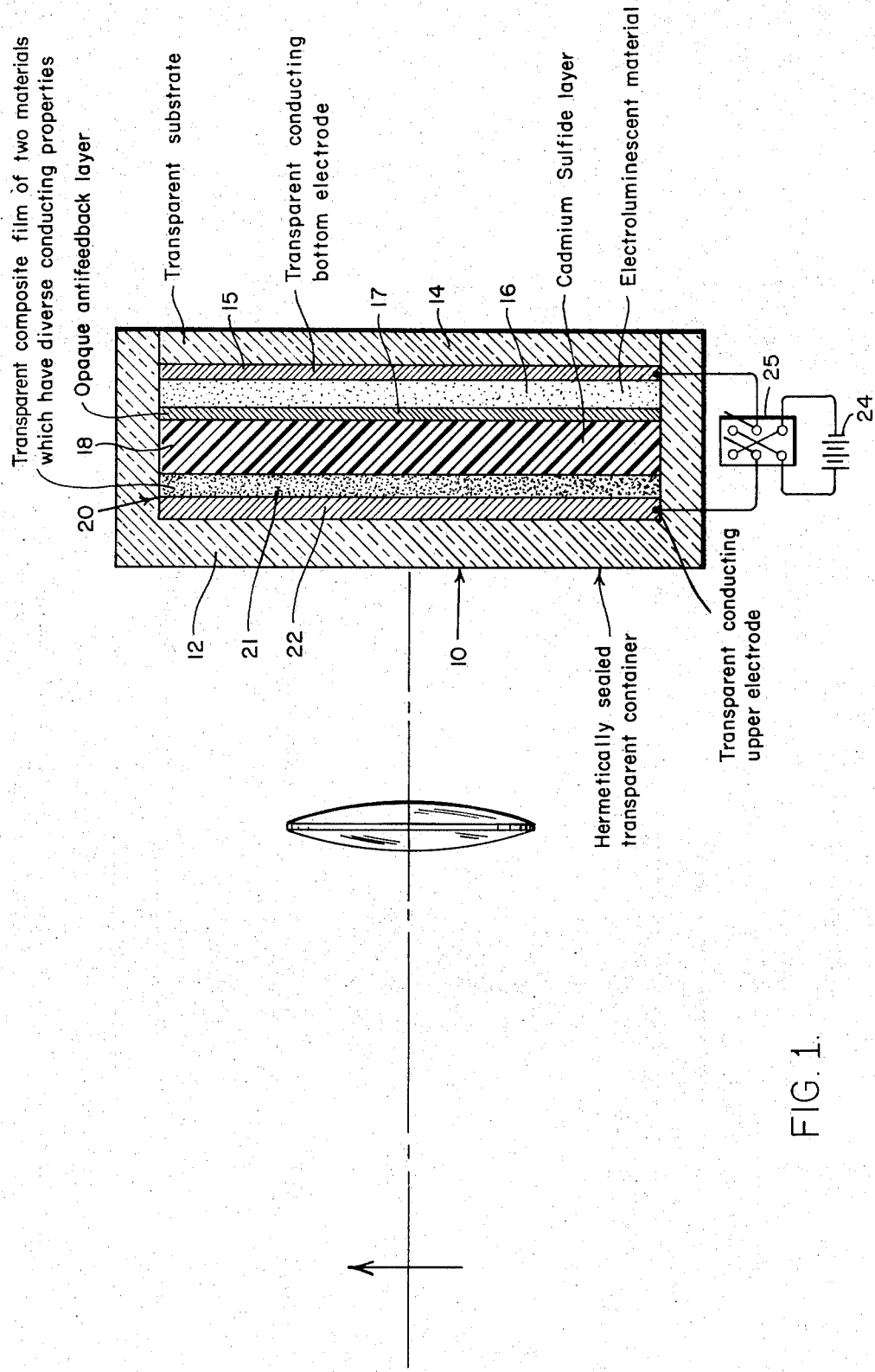
FIG. 1 shows a cross section of the light activated image storage and display device of the present invention.

Referring now to the drawings and to FIG. 1 in particular a light activated image storage and display device using an improved field sustained conducting target comprises a flat hermetically sealed envelope 10 including an optically transparent flat cylindrical portion 12 which accommodates an optically transparent substrate 14. Disposed on the inner surface of the transparent substrate 14 is a transparent conducting bottom electrode 15. In situations where glass is employed for the transparent substrate 14, the bottom electrode 15 may comprise stannous oxide doped with antimony. On the bottom electrode 15 is deposited a layer of electroluminescent material 16 which typically can be vacuum deposited zinc sulfide doped with copper, manganese and chlorine and given suitable post deposition heat treatment to obtain low voltage dc electroluminescence. This heat treatment typically comprises exposing the electroluminescent layer 16 to a temperature of 675°C at 1 micron pressure of air for a period of from 5 to 15 minutes. A more detailed description of electroluminescent phosphors suitable for use in the device of the present invention and their preparation is found in an article by P. Goldberg and J. W. Nickerson in the Journal of Applied Physics (1963), Vol. 34 at page 1,601.

On the electroluminescent layer 16 is deposited a layer 17 of germanium or a mixture of germanium and silicon monoxide of suitable thickness to be opaque to light and have high resistivity in directions parallel to the transparent substrate 14. Following this, a layer 18 of cadmium sulfide is vacuum deposited on the structure and processed in the manner hereinafter described. The final step is to apply a top electrode 20 which includes two layers over the cadmium sulfide layer 18. A first layer of the double layered top electrode 20 constitutes a transparent composite film 21 of two materials which have diverse conducting properties such as a metal and dielectric, a metal and semiconductor or a semiconductor and dielectric. The manner of application and composition of first layer 21 is hereinafter described in greater detail. A second layer of the double layered top electrode 20 is designated the upper electrode 22 and constitutes a transparent conducting film which can, for example, be a thin layer of gold. A battery 24 of from 40 to 100 volts dc is connected through a reversing switch 25 from the upper electrode 22 to the bottom electrode 15. The switch 25 may, of course, be electronic rather than mechanical. The entire panel is then covered by the flat transparent cylindrical container 12 and hermetically sealed to the transparent substrate 14.

It has been found that the electrical characteristics of field sustained conductivity devices fabricated according to the process of the present invention critically depend upon the thermal processing of cadmium sulfide layer 18 together with the characteristics of top electrode 20. These characteristics include the ability of the cadmium sulfide layer 18 to increase in conductivity as a result of excitation with a light beam, to store these conductivity changes, to integrate successive excitations and to return to the low conductivity state as a result of a momentary reversal or removal of an electric field applied across the cadmium sulfide layer 18 by the top and bottom electrodes 20, 15 and voltage source 24.

The fabrication of the light activated, high resolution, field sustained conductivity image storage and display device according to the invention may be classified into five basic processing steps: (1) deposition of the bottom electrode 15, electroluminescent layer 16 and opaque layer 17 onto the transparent substrate 14; (2) thermal processing of the electroluminescent layer 16 just prior to deposition of opaque layer 17; (3) evaporation of the cadmium sulfide layer 18 onto the opaque layer 17; (4) thermal processing of the cadmium sulfide layer 18, and (5) deposition of the top electrode 20 on the cadmium sulfide layer 18 emerging from step 3. Following this outline, the fabrication of a light activated image storage and display device having an improved field sustained conductivity storage panel will now be described. It will be understood that many variations in the process are available and that dimensions and shape are exemplary only.

DEPOSITION OF BOTTOM ELECTRODE 15, ELECTROLUMINESCENT LAYER 16 AND OPAQUE INSULATING LAYER 17

The first step in device fabrication is to prepare the transparent substrate 14 and deposit thereon the so-called "bottom" electrode 15. In general, a variety of transparent conducting materials can be deposited to serve as the bottom electrode. It is required, however, that the inner surface of substrate 14 be well cleaned by an appropriate technique prior to the electrode deposition. A $SnO_2$:Sb electrode on the glass substrate 14 is a preferred material since it is highly transparent. When a non-commercial vacuum deposited bottom electrode 15 is freshly prepared in the laboratory, its surface requires no cleaning or other treatment in preparation for the zinc sulfide deposition. The electroluminescent layer 16 and thin opaque insulating layer 17 are deposited over the bottom electrode 15 by standard evaporation or co-evaporation techniques. Prior to the deposition of the opaque film, the electroluminescent layer 16 is heat-treated in the manner previously suggested to achieve film activation.

DEPOSITION OF CDS LAYER 18

Figure 2:
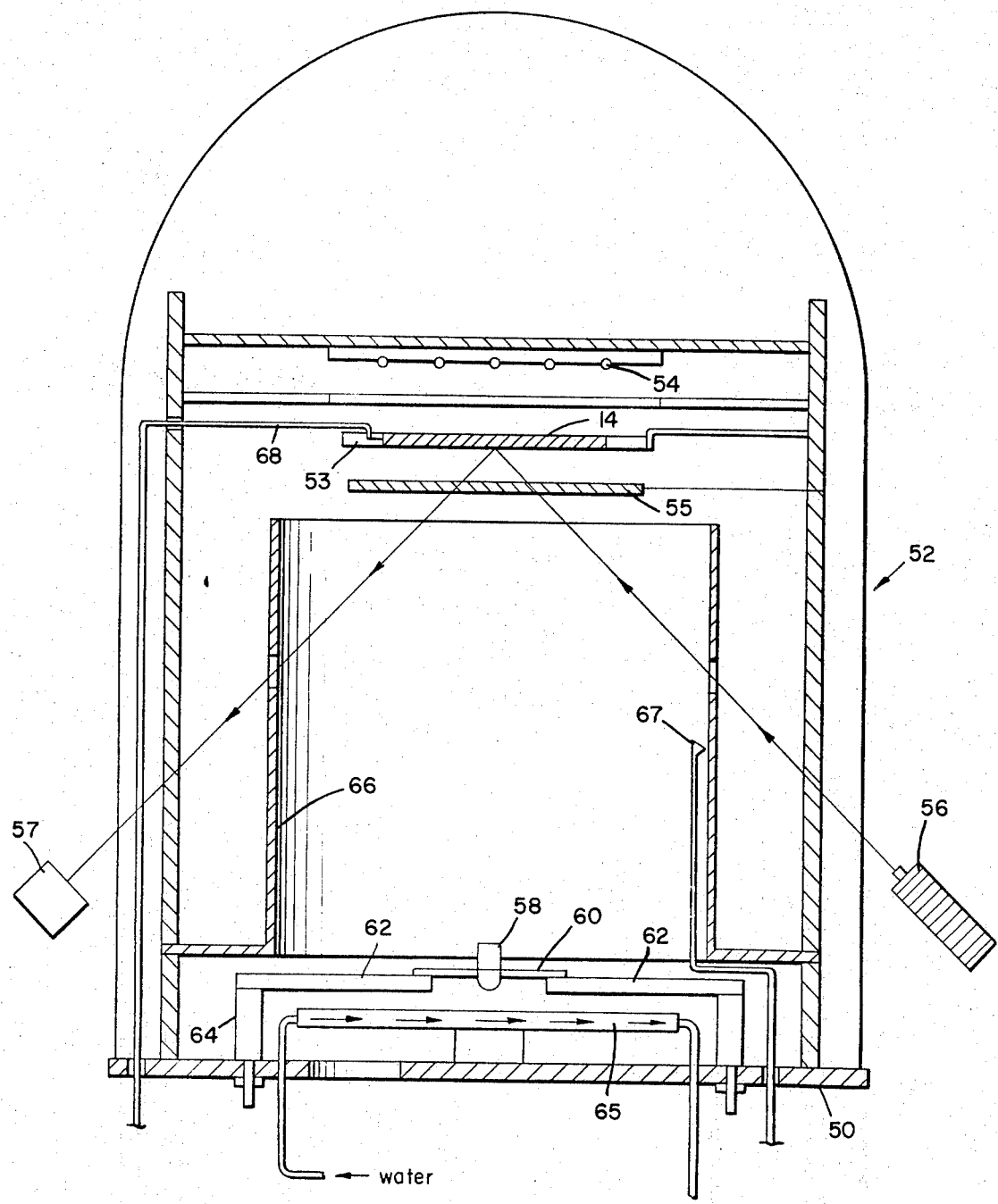
FIG. 2 illustrates apparatus used to carry out the deposition of the cadmium sulfide film step in fabricating the device of FIG. 1.

The third step in the device fabrication is the vacuum deposition of the CdS layer 18. The deposition may be done in the bell jar of a conventional high vacuum system in the pressure range of $1 \times 10^{-7}$ to $1 \times 10^{-5}$ Torr. The pressure, however, does not appear to be critical. A cross-section drawing of the instrumentation is shown in FIG. 2. The vacuum is enclosed by a baseplate 50 and a glass bell jar 52. The electroded and treated substrate 14 from step (2) is held by a stainless steel substrate holder 53 and heated by quartz lamps 54. A removable shutter 55 shields the substrate 14 until deposition on it is to be commenced. The thickness of the CdS layer is directly and continuously monitored on the substrate by the use of optical interference. This is accomplished with the use of a laser 56 and detector 57 positioned outside the bell jar 52.

Electronic grade CdS powder, in the form of a pressed cylindrical pellet 58, is evaporated from a formed tantalum boat 60 which is resistively heated by current passing through buss bars 62 and current feedthroughs 64. The boat 60 is designed such that as the CdS evaporates, the pressed pellet 58 settles down into the boat. This gives an efficient thermal evaporation over the long period of time required for the deposition of the CdS films. The evaporation rate is controlled by controlling the current to the tantalum boat. The current is set so that 2.5 microns of CdS as monitored by optical interference is deposited on the electroded substrate 14 in 1 hour. Typical thicknesses of CdS films are 5 – 12.5 microns so that deposition times of 2–5 hours are required. Successful results have been obtained with thicknesses from 2–15 microns and evaporation rates from 0.5 to 10.0 micron/hr. To avoid the heating of the various elements in the deposition chamber by radiation from the tantalum boat 60, a water cooled plate 65 is positioned beneath the boat 60 and extends to the diameter of a cylindrical stainless steel deposition chamber 66 disposed thereabout. The water-cooling is used to maintain the temperature of the wall of chamber 66 as measured by a thermocouple 67 below 60°C. This low temperature, as compared with the electroded substrate 14 temperature of 130°C., as measured by a thermocouple 68, is necessary to obtain the desired characteristics in the films. It should be noted, however, that the important fact is that the chamber 66 and baseplate 50 are maintained at a lower temperature than the substrate 14 and that methods of achieving this can be determined by one skilled in the art. Also, the temperatures given can be changed to vary the conductivity and current-voltage characteristics of the CdS films. A range of substrate temperatures from 100° to 200°C. and chamber wall temperatures from 40 to 90°C. have been used to make CdS films of the given characteristics.

POST DEPOSITION THERMAL PROCESSING

Figure 3:
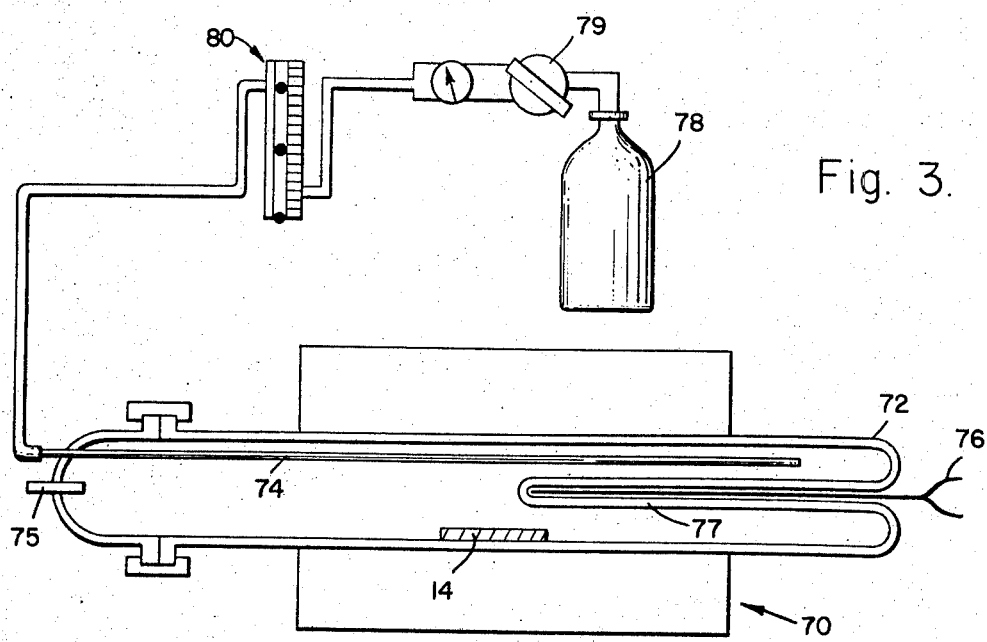
FIG. 3 illustrates apparatus used to carry out the post deposition thermal processing step in fabricating the device of FIG. 1.

The fourth step in device fabrication is the post-deposition thermal processing of the device as it emerges from step 3. The preferred process under the present invention can be seen by reference to FIG. 3. A controllable furnace 70 is provided with a quartz tube 72 of suitable diameter. A gas inlet tube 74 introduces gas which is preheated while passing through the core of the furnace. The gas exits through short exit tube 75. The temperature (for monitoring and control) near the center of the tube and also near the center of the hot zone is provided by a thermocouple 76 sheathed in a quartz tube 77. The multi-layered structure with the exposed CdS surface is placed near the center of the hot zone. A controllable flow of gas from a gas cylinder 78 is provided by pressure regulator 79 and flowmeter 80.

It should be recognized that other configurations obvious to those skilled in the art, can be used. In operation the following procedure is followed. First the substrate 14 is inserted in the tube 72 and the tube is flushed out with the gas from cylinder 78. Typically Argon is used, but other non-sulfur atmospheres have been used successfully, including nitrogen and air. Then the flow of Argon is typically reduced to 10 CFH (at standard temperature and pressure) and the furnace turned on. Flow rates from 0.1 CFH to 20 CFH have been used with success. The oven is brought to the desired temperature, typically 500°C., and kept at that temperature for the desired time, typically 1 minute. Temperatures from 385° to 525° C. and times from 1 minute to 60 minutes have been successfully used. The particular time and temperature used depends on the thickness of the CdS layer 18, the substrate material, and the type of gas used. Also the device characteristics, for a given thickness of CdS film, substrate material, and gas, can be altered by changing the temperature and time. After the desired time has elapsed, the quartz tube 72 is physically removed from the furnace 70 and allowed to cool in 20 minutes to 70°C., at which point the substrate 14 is removed.

While this rapid cooling produces superior results, devices exhibiting satisfactory characteristics can also be obtained by leaving the quartz tube 72 in the furnace 70 and turning off the power to the furnace. Under these circumstances, the substrate 14 cools down at a rate estimated to be about a factor of 10 more slowly than when the quartz tube 72 is removed from the furnace 70.

DEPOSITION OF DOUBLE-LAYERED ELECTRODE 20

The final step in device fabrication is to apply the top electrode 20 to the panel as it emerges from step 4. In the present panel, the top electrode 20 is made up of first and second layers 21, 22. The first layer 21 applied of the double-layered electrode 20, FIG. 1, is a composite film of two materials which have diverse conducting properties (metal/dielectric, metal/semiconductor, semiconductor/dielectric, etc.) and the second layer 22, FIG. 1, is a simple metal film overlayer. Negative contact is made to the device via the metal overlayer 22.

Figure 4:
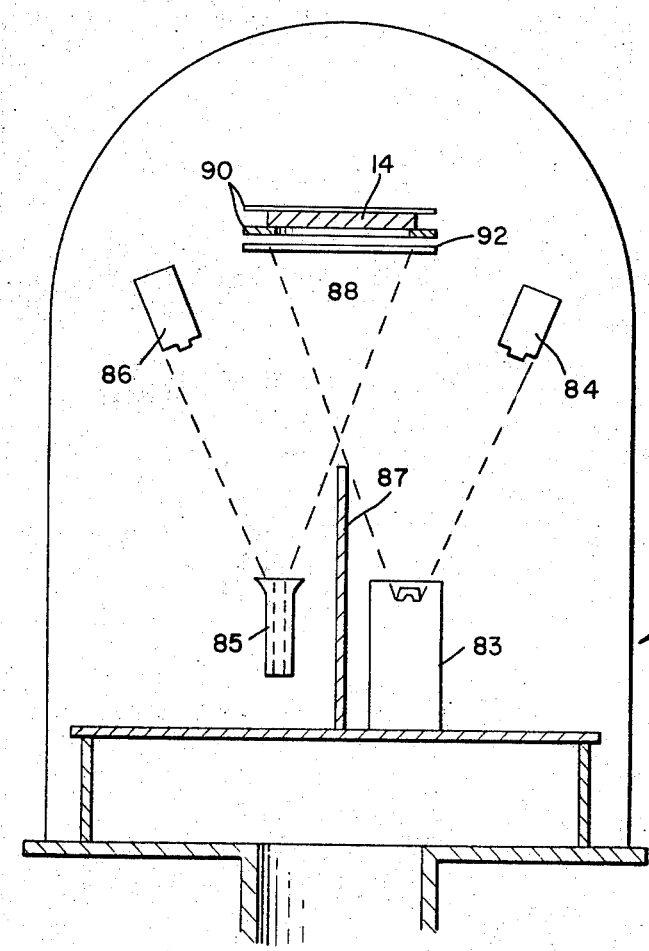
FIG. 4 illustrates apparatus used to carry out the coevaporation of the composite electrode and the evaporation of the transparent conducting upper electrode in the device of FIG. 1.

The preferred type of composite film 21 has been a mixed coevaporated layer of gold and silicon monoxide. This film is prepared in a vacuum chamber 82 such as shown in FIG. 4. In practice the Au is evaporated using an electron beam evaporator 83 and the rate of Au evaporation is measured and controlled by a rate monitor 84. Similarly, the SiO is evaporated from a Drumheller source 85 and the rate of SiO evaporation is measured and controlled by rate monitor 86. Although the evaporations take place simultaneously, an optical shield 87 prevents each rate monitor from sensing any of the evaporant from the other source. This shield 87 does, however, allow the evaporant streams to mix in region 88 of the chamber 85. It is in this region 88 that composite film deposition occurs. The substrate 14 as it emerges from step 4 is placed in a rotating substrate holder 90 shielded by a shutter 92 and the chamber 82 is pumped to approximately $10^{-6}$ Torr. The rates of the individual evaporants are then set to a predetermined level (which controls their relative composition in the deposited film), the shutter 92 is opened, and the film is deposited for a fixed time at the preset rates to yield the desired thickness. Typical films are on the order of 2,500 A thick and contain a few percent Au, but other compositions and thicknesses may also be used. Over this composite film 21 a continuous conducting transparent electrode 22 is then deposited to complete the device. Negative contact is made to the panel via the metal over-layer 22 of the top electrode 20. The preferred type of composite film has been a mixed coevaporated layer of gold and silicon monoxide. However, other metals have been successfully substituted for gold, such as aluminum, silver, platinum and tin and other dielectrics have been substituted for silicon monoxide, such as, for example, magnesium oxide. Semiconductor materials such as germanium have also been substituted for the metallic element in the composite film with good results. In addition to the coevaporation technique for obtaining the composite film, three other techniques have also been used with good success. One technique is to precipitate a monolayer of metal particles on the surface of the cadmium sulfide thin film 34 and then apply an overlayer of a dielectric such as silicon monoxide. Another technique is to first evaporate a very thin discontinuous metal film onto the cadmium sulfide surface followed by an overlayer of dielectric. Each of these techniques require a final overlayer of transparent conducting metal.

The above contacting techniques have the common feature that the film surface immediately adjacent to the cadmium sulfide layer 18 in all cases consists of islands or patches of a material of one conductivity type (for example, metal) surrounded by regions of a material of a diverse conductivity type (for example, dielectric). It is this common unique feature which, when combined with the cadmium sulfide layer 18 as prepared above, gives rise to the enhanced sustained conductivity effects found in the field sustained conductivity device of the present invention.

The image storage panel of the present invention is operated by applying a dc bias of from 40 to 100 volts dc across the panel with the bottom electrode 15 positive and the upper electrode 22 negative. This is done by appropriate positioning of the switch 25. Without any light incident on the upper electrode 22, a small dark or erase current flows through the structure with most of the bias voltage occurring across the cadmium sulfide layer 18. This current level is insufficient to produce electroluminescense in layer 16. When light is momentarily incident on a particular region of the upper transparent electrode 22, the resistivity of the cadmium sulfide layer 18 in that region is reduced, thereby allowing a sustained current to flow and transferring the bias to fall across the electroluminescent layer 16. This causes the excited region of the layer 16 to electroluminesce, thus giving a stored image of the input image. The panel is returned or erased to the low current or dark screen state by momentarily removing or reversing the applied dc voltage by means of switch 25, for example. In actual practice, switch 25 would normally be operated electronically.

The storage panel of the invention can be used as a display and storage medium for optically transmitted information. Two possible modes of operation are: (1) with a laser beam, modulator, and deflection system to give a scanning type input, or (2) with a system that projects an entire frame at one time as illustrated in FIG. 1. The frame erase time of 10 msec would allow the screen to be run at TV rates while any particular frame could be stored and displayed for up to 30 sec. The panel could also be used to integrate low light level images and display them. As indicated above, the black face of the panel would allow operation under some degree of ambient light. In general the fabrication is simple, consisting only of vacuum depositions and thermal processes, and requires inexpensive starting materials. The storage panel of the invention is rugged and compact, can be made in different shapes and sizes, and only requires a dc bias supply of below 100 V.

What is claimed is:

1. A light activated, high resolution field sustained conductivity image storage and display panel comprising:
   a. an optically transparent substrate;
   b. a bottom electrode constituting a transparent conductive coating on one side of said substrate;
   c. an electroluminescent layer disposed over said transparent conductive coating;
   d. a light opaque layer disposed over said electroluminescent layer, said light opaque layer having a high resistance in directions parallel to the surface of said substrate;
   e. a layer of cadmium sulfide disposed over said light opaque layer, said layer of cadmium sulfide being heated at a temperature of from 385° to 525°C. for a period of from one minute to one hour in a non-sulfur-containing atmosphere followed by cooling in said atmosphere;
   f. an electrode member in the form of a composite layer of two materials which have diverse conducting properties disposed on said heat treated layer of cadmium sulfide;
   g. an upper electrode constituting a transparent conductive film disposed over said composite layer;
   h. a transparent cover disposed over said top electrode and hermetically sealed to said substrate; and
   i. means for applying a dc bias voltage across said bottom and upper electrodes.

2. The invention according to claim 1 wherein said non-sulfur-containing atmosphere in which said layer of cadmium sulfide is heated is a gas selected from a group of gases consisting essentially of argon, nitrogen and air.

3. The invention according to claim 1 wherein said composite layer of two materials which have diverse conducting properties constitutes a composite film of a metal selected from a group consisting of gold, aluminum, silver, platinum and tin and a dielectric selected from a group consisting of silicon monoxide and magnesium oxide.

4. The invention according to claim 1 wherein said composite layer of two materials which have diverse conducting properties constitutes a composite film of a semiconductor material and a dielectric selected from a group consisting of silicon monoxide and magnesium oxide.

5. The invention according to claim 4 wherein said semiconductor material is germanium.

6. A light activated, high resolution field sustained conductivity image storage and display panel comprising:
   a. an optically transparent planar substrate;
   b. a bottom electrode constituting a transparent conductive coating on one side of said substrate;
   c. a phosphor layer capable of having its luminescence modulated in response to an electrical field established thereacross disposed over said bottom electrode;
   d. a light opaque layer disposed over said phosphor layer, said light opaque layer having a high resistance in directions parallel to the surface of said planar substrate;
   e. a layer of cadmium sulfide disposed over said light opaque layer, said layer of cadmium sulfide being from 2 to 15 microns thick;

f. an electrode member in the form of a composite layer of two materials which have diverse conducting properties disposed on said layer of cadmium sulfide;

g. an upper electrode constituting a transparent conductive film disposed over said composite layer;

h. a transparent cover disposed over said top electrode and hermetically sealed to said substrate; and i. means for applying a dc bias voltage across said bottom and upper electrodes.

* * * * *